United States Patent
Kuroda et al.

(10) Patent No.: US 6,272,416 B1
(45) Date of Patent: Aug. 7, 2001

(54) VEHICLE DRIVE FORCE CONTROL DEVICE

(75) Inventors: Kouichi Kuroda; Hiroshi Sato, both of Yokosuka; Yoshihiro Sato, Ebina; Hiroshi Abe, Yokosuka; Nobusuke Toukura, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/246,096

(22) Filed: Feb. 8, 1999

(30) Foreign Application Priority Data

Feb. 10, 1998 (JP) .................................................. 10-028662

(51) Int. Cl.[7] ...................................................... G06F 7/70
(52) U.S. Cl. ........................... 701/70; 701/200; 340/990; 180/170
(58) Field of Search ................................ 701/70, 72, 200, 701/111, 95; 340/990, 995; 180/170

(56) References Cited

U.S. PATENT DOCUMENTS

| | | | |
|---|---|---|---|
| 4,933,859 | * | 6/1990 | Tsuyama et al. ................ 701/93 |
| 5,146,219 | * | 9/1992 | Zechnall ........................ 340/995 |
| 5,315,295 | * | 5/1994 | Fujii ............................. 340/936 |
| 5,485,161 | * | 1/1996 | Vaughn ...................... 342/357.13 |
| 5,504,482 | * | 4/1996 | Schreder ........................ 340/995 |
| 5,546,311 | * | 8/1996 | Sekine .......................... 701/208 |
| 5,598,335 | * | 1/1997 | You ............................... 701/65 |
| 5,716,301 | * | 2/1998 | Wild et al. ...................... 477/97 |
| 5,752,214 | * | 5/1998 | Minowa et al. ................ 701/111 |
| 5,771,007 | * | 6/1998 | Arai et al. ...................... 340/903 |
| 5,832,400 | * | 11/1998 | Takahashi et al. ................ 701/53 |
| 5,857,754 | * | 1/1999 | Fukami et al. ................. 303/146 |
| 5,893,894 | * | 4/1999 | Moroto et al. .................... 701/53 |
| 5,941,934 | * | 8/1999 | Sato .............................. 701/217 |
| 5,955,973 | * | 9/1999 | Anderson ....................... 340/988 |
| 6,032,098 | * | 2/2000 | Takahashi et al. .............. 701/210 |
| 6,046,671 | * | 4/2000 | Shimoura et al. ............... 340/439 |
| 6,061,629 | * | 5/2000 | Yano et al. ..................... 701/209 |
| 6,138,084 | * | 10/2000 | Mine ............................. 702/157 |
| 6,182,000 | * | 1/2001 | Ohta et al. ....................... 701/55 |

FOREIGN PATENT DOCUMENTS 7-125566    5/1995 (JP) .

* cited by examiner

Primary Examiner—William A. Cuchlinski, Jr.
Assistant Examiner—Olga Hernandez
(74) Attorney, Agent, or Firm—Foley & Lardner (57) ABSTRACT

A control device detects a curve in front of a vehicle based on the vehicle position and map information, and a driver's accelerator pedal operation is detected based on a sensor output. When a curve is detected in front of the vehicle and it is detected that the driver has released the accelerator pedal, a speed ratio of the automatic transmission is modified to generate a deceleration force.

9 Claims, 8 Drawing Sheets

VEHICLE DRIVE FORCE CONTROL DEVICE

FIELD OF THE INVENTION

The present invention relates to vehicle drive force control, and in particular relates to a device for modifying drive force characteristics when a vehicle is travelling on a curve.

BACKGROUND OF THE INVENTION

A device is known for automatically modifying drive force characteristics according to external conditions in order to enhance stability during travel.

Tokkai Hei 7-125566 published by the Japanese Patent Office in 1995 discloses a technique wherein it is determined whether or not a vehicle can take a curve based on the curvature of the curve in front of the vehicle and a vehicle speed, and automatically decelerating the vehicle when it is determined that the vehicle speed is too high to take the curve safely. Information on the curvature of the curve is given by a vehicle navigation device, i. e. a combination of a global positioning system (GPS) receiver and a prestored map.

SUMMARY OF THE INVENTION

However, in this prior art technology, the vehicle decelerates regardless of the driver's operations, so it is possible that the driver will experience discomfort. The time at which the driver makes a decision to decelerate will also depend on the shape of the road, the driving conditions and the driver him/herself. In the prior art controller, it was impossible to modify the deceleration start timing in accordance with all these conditions.

It is therefore an object of this invention to reflect the driver's intention in a controller which adjusts drive force characteristics when a vehicle takes a curve, and thereby to reduce the driver's discomfort.

In order to achieve above object, this invention provides a drive force control device for a vehicle comprising deceleration force generating mechanism for decelerating the vehicle, a sensor for detecting a position of the vehicle, a storing medium wherein map information is stored, a sensor for detecting release of an accelerator pedal and a microprocessor. The microprocessor is programmed to detect a curve in front of the vehicle based on the vehicle position and map information and control the deceleration force generating mechanism to decelerate the vehicle when a curve is detected in front of the vehicle and release of the accelerator pedal is detected.

The details as well as other features and advantages of this invention are set forth in the remainder of the specification and are shown in the accompanying drawings.

DETAILED DESCRIPTION OF THE INVENTION

Figure 1:
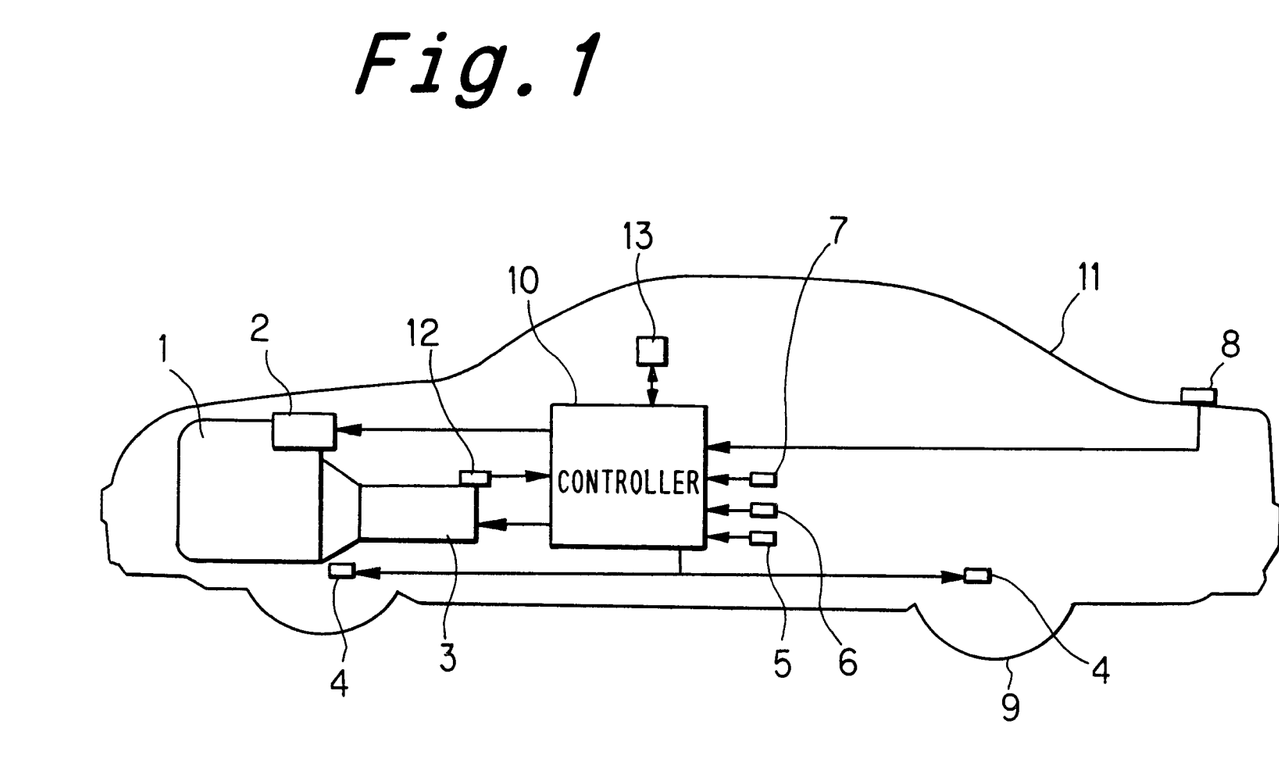
FIG. 1 is a schematic diagram of a vehicle drive force control device according to this invention.

Referring to FIG. 1 of the drawings, a vehicle 11 comprises an engine 1 and an automatic transmission 3 comprising a torque converter. The output torque from the engine 1 is transmitted to drive wheels 9 via the automatic transmission 3, a propeller shaft and a drive shaft, not shown.

An electronic control throttle 2 which is opened and closed by a motor is provided in an intake passage of the engine 1. The air intake of the engine 1 is adjusted according to the opening of the throttle 2 so as to control the output torque of the engine 1. The opening of the throttle 2 is feedback controlled by a controller 10 comprising a microprocessor.

An accelerator pedal operating signal from an accelerator pedal operation sensor 5, a brake pedal operating signal from a brake pedal operation sensor 6, a shift lever position signal from an inhibitor switch 7, a vehicle speed signal from a vehicle speed sensor 12, and signals from an engine rotation speed sensor and air intake sensor, not shown, are input to the controller 10. The controller 10 controls fuel supply and ignition timing of the engine 1, a speed ratio of the automatic transmission 3 and a brake oil pressure of the vehicle wheels via a brake actuator 4. Herein, the speed ratio is a ratio of the input rotation speed to the output rotation speed of the transmission 3.

A GPS receiver 8 which receives signals from satellites is provided at the rear of the vehicle 11. The controller 10 computes the position and travel direction of the vehicle 11 based on the information obtained by the GPS receiver 8 and map information stored in a recording medium 13. The recording medium 13 may for example be an optical disk system.

Figure 2:
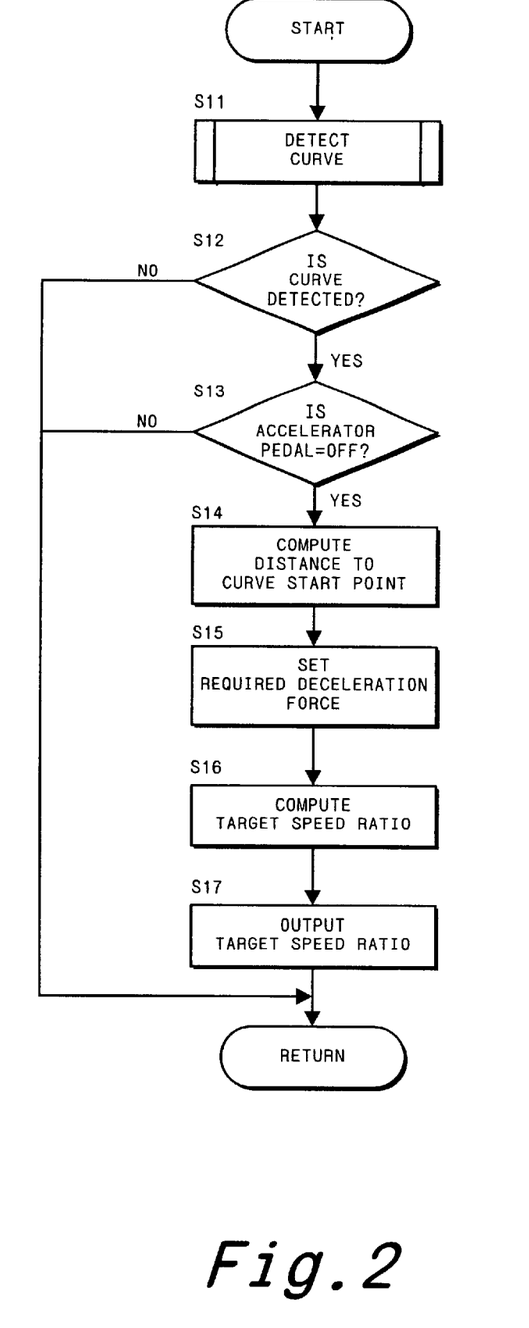
FIG. 2 is a flowchart describing a drive force control process performed by a controller according to this invention.

FIG. 2 shows a drive force control process performed by the controller 10 at an interval of, e.g., 10 milliseconds.

First, in a step S11, a curve in front of the vehicle 11 is detected based on the vehicle position and map information. The curve detection process will be described later.

In a step S12, it is determined whether or not a curve has been detected. When it is determined that a curve has been detected, the routine proceeds to a step S13, and when it is determined that a curve has not been detected, the process is terminated.

In a step S13, it is determined whether or not the driver has released the accelerator pedal based on the output of the sensor 5. When it is determined that the driver has released the accelerator pedal, the routine proceeds to a step S14, otherwise the process is terminated.

In a step S14, the distance along the road to the point at which the curve-starts is computed from the vehicle position ba on the output of the GPS receiver 8 and the map information.

Figure 3:
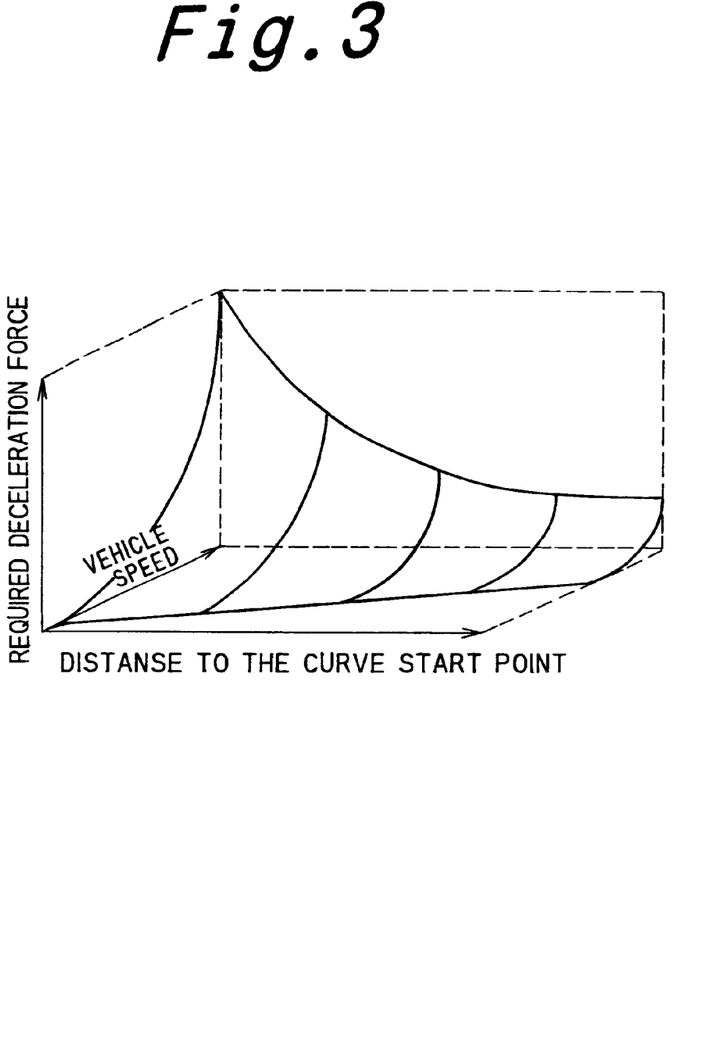
FIG. 3 is a map stored by the controller for setting a required deceleration force.

In a step S15, a deceleration force required to decelerate the vehicle 11 to a speed at which the curve can be taken safely (referred to hereafter as "required deceleration force") is set based on the vehicle speed and the distance to the point at which the curve starts. The required deceleration force is set by looking up a map shown in FIG. 3. As seen in FIG. 3, the required deceleration force is set larger the shorter the distance to the curve starting point, and larger the higher the vehicle speed.

In a step S16, a speed ratio required to generate the required deceleration force set in the step S15 is computed (referred to hereafter as "target speed ratio").

In a step S17, this target speed ratio is output to the automatic controller 3 so as to generate the required deceleration force.

Next, the curve detection process performed by the controller 10 will be described referring to FIG. 4.

First, in steps S21, S22, the vehicle position and travel direction are computed based on signals from the GPS receiver 8 and map information.

Figure 4:
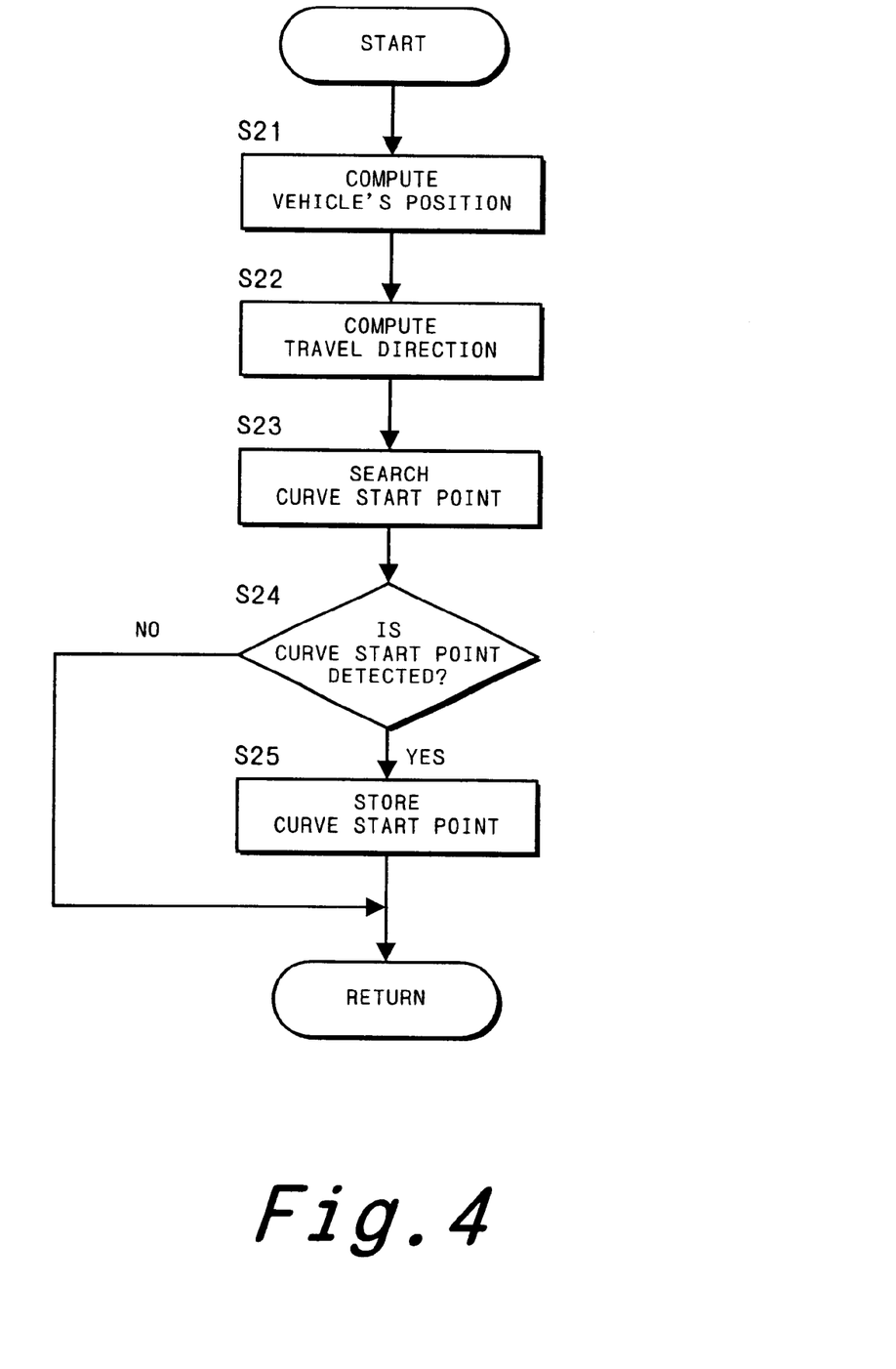
FIG. 4 is a flowchart describing a curve detection process performed by the controller.
Figure 5:
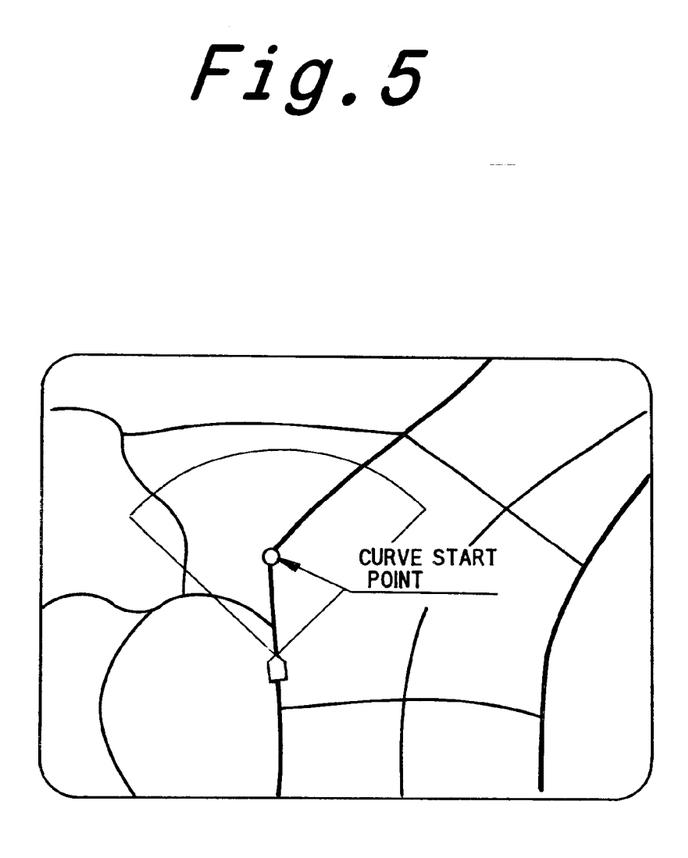
FIG. 5 is a map stored by the controller for detecting a curve.

In a step S23, a point at which the curvature radius of the road is less than a predetermined value is searched within a predetermined fan-shaped range in front of the vehicle 11 using map information stored in the recording medium 13, e.g. a map shown in FIG. 5.

In the step S24, it is determined whether or not a point at which the curvature radius was less than a predetermined value was detected within the predetermined range. When it is determined that a point having a curvature radius less than the predetermined value was detected, the routine proceeds to a step S25, and this point is stored as the curve start point. In all other cases, processing is termninated.

Therefore, according to this embodiment, by performing the process shown in FIG. 2 and FIG. 4, the controller 10 modifies the speed ratio of the automatic transmission 3 and generates a deceleration force, when there is a curve in front of the vehicle 11 and the driver releases the accelerator pedal. As the deceleration force is generated only after the accelerator pedal is released, the vehicle 11 can be decelerated down to a speed required to pass the curve safely without giving an unpleasant feeling to the driver.

The deceleration force is not produced when the driver is depressing the accelerator pedal, therefore the vehicle 11 does not decelerate while the accelerator pedal is depressed as in the aforesaid prior art, and the driver does not experience an unpleasant feeling.

The magnitude of the deceleration force which is generated is set according to the vehicle speed and distance to the curve start point, so a deceleration force greater than necessary is not produced when a large force is not required such as when a curve is far away or the vehicle speed is low, and the converse situation where sufficient deceleration force is not produced although a curve is near or vehicle speed is high, is prevented.

Here, the deceleration force was generated by modifying the speed ratio of the automatic controller 3, but the method of generating the deceleration force is not limited to this. The deceleration force may also be generated by operating the brake actuator 4 as described later, or by decreasing the opening of the throttle 2 to reduce the output torque of the engine 1.

Figure 6:
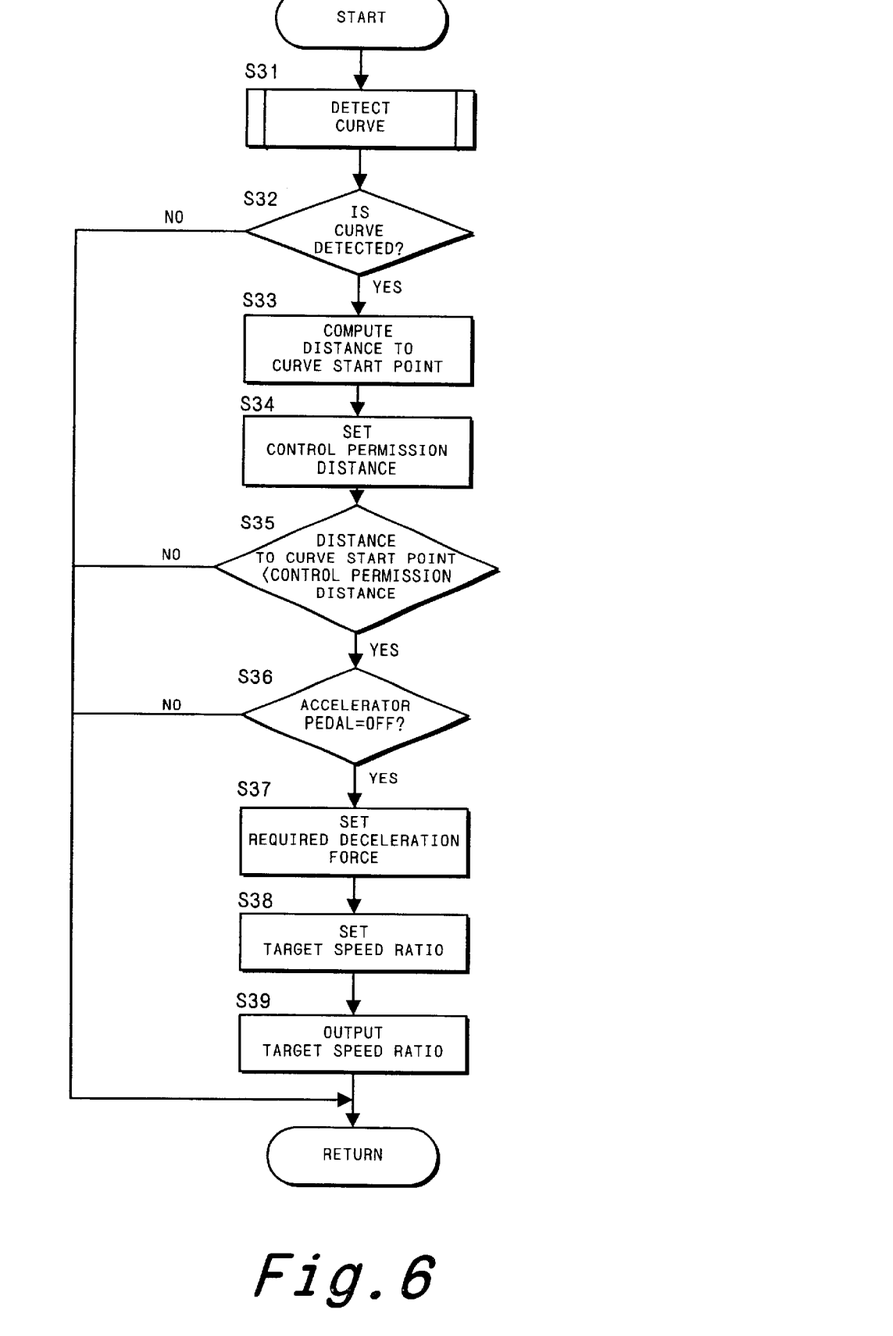
FIG. 6 is similar to FIG. 2 but showing a second embodiment of the present invention.

FIG. 6 shows a second embodiment. As in the case of FIG. 2, this figure shows a drive force control process performed by the controller 10, e.g. at an interval of 10 milliseconds.

First, in a step S31, a curve in front of the vehicle 11 is detected. The curve detection process is the same as that of the aforesaid embodiment. In a step S32, it is determined whether or not a curve has been detected. When it is determined that a curve has been detected, the routine proceeds to a step S33, and when it is determined that a curve has not been detected, processing is terminated.

In the step S33, a distance along the road to the stored curve start point is computed from the vehicle position based on the output of the GPS receiver 8 and map information.

Figure 7:
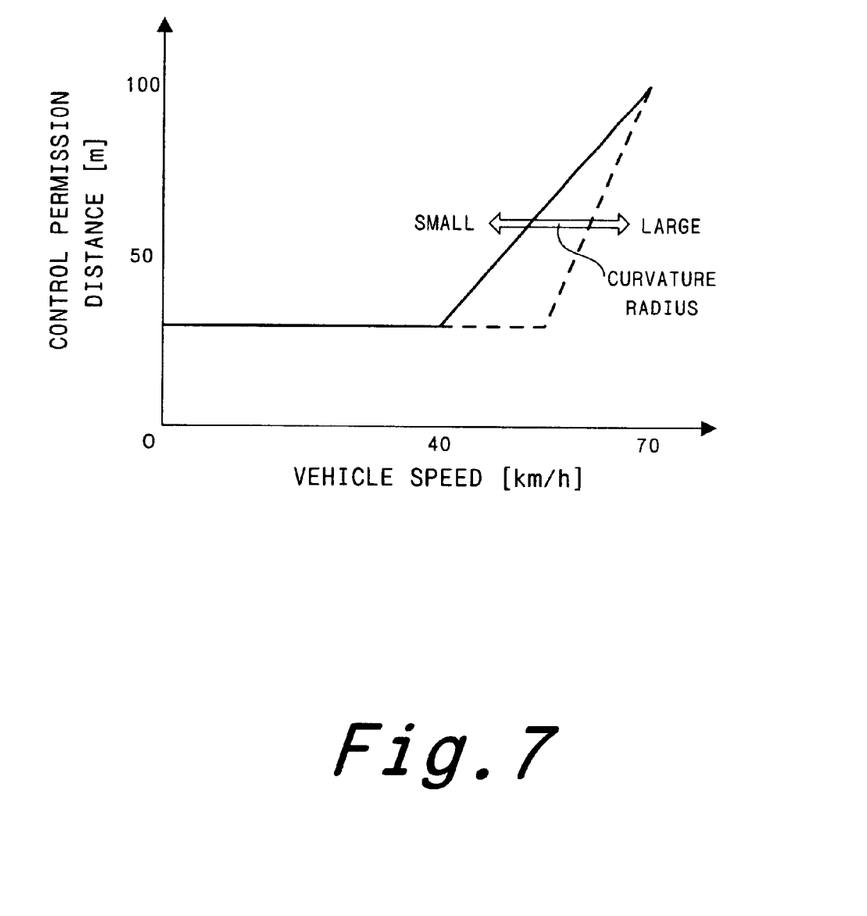
FIG. 7 is a map stored by a controller according to the second embodiment for setting a control permission distance.

In a step S34, a control permission distance is set according to the vehicle speed and curvature radius of the road at the curve start point by referring to a map shown in FIG. 7.

The control permission distance is set to a larger value the higher the vehicle speed. According to the map shown in FIG. 7, the rate of increase of the control permission distance relative to the vehicle speed is larger the larger the curvature radius of the curve in front of the vehicle 11, so the control permission distance is set larger the smaller the curvature radius for the same vehicle speed. Also, when the curvature radius is greater than a predetermined value, the relation between the vehicle speed and control permission distance ceases to depend on the curvature radius. Moreover, the control permission distance never falls below a predetermined value even if the vehicle speed is low.

In a step S35, it is determined whether or not the distance to the curve start point is less than the control permission distance. When the distance to the curve start point is less than the control permission distance, the routine proceeds to a step S36, otherwise the process is terminated.

In the step S36, it is determined whether or not the driver has released the accelerator pedal based on the output of the sensor 5. When it is determined that the driver has released the accelerator pedal, the routine proceeds to a step S37, otherwise the process is terminated.

In the step S37, the required deceleration force is set by referring to a map shown in FIG. 3 based on the vehicle speed and distance to the curve start point as in the aforesaid embodiment.

In a step S38, a target speed ratio required to generate the required deceleration force set in the step S37 is computed.

In a step S39, the target speed ratio is output to the automatic transmission 3 to generate the required deceleration force.

Therefore in this second embodiment, when the vehicle 11 is running at high speed, the release of the accelerator pedal is detected even when a curve is far away, and conversely when the vehicle 11 is running at low speed, the release of the accelerator pedal is not detected until a curve is approached. In this way, the release of the accelerator pedal with regards to curves, is correctly detected.

For example, when the vehicle 11 is running at high speed, the release of the accelerator pedal is detected and a deceleration force is produced even when a curve is far away, so the safety of the vehicle 11 when running at high speed is enhanced. Further, when the vehicle 11 is running at low speed, the release of the accelerator pedal is not detected even if it is released until a curve approaches, so a deceleration force is not generated for this acceleration pedal release operation which is unrelated to curves, and therefore an unpleasant feeling is not imparted to the driver.

Herein, the deceleration force was generated by modifying the speed ratio of the automatic transmission 3, but the method of generating the deceleration force is not limited to this. The deceleration force may also be generated by operating the brake actuator 4 as described later, or by reducing the opening of the throttle 2.

The control permission distance was set based on the vehicle speed and curvature radius of the road at the curve start point, however it may be set based on either the vehicle speed or the curvature radius.

Figure 8:
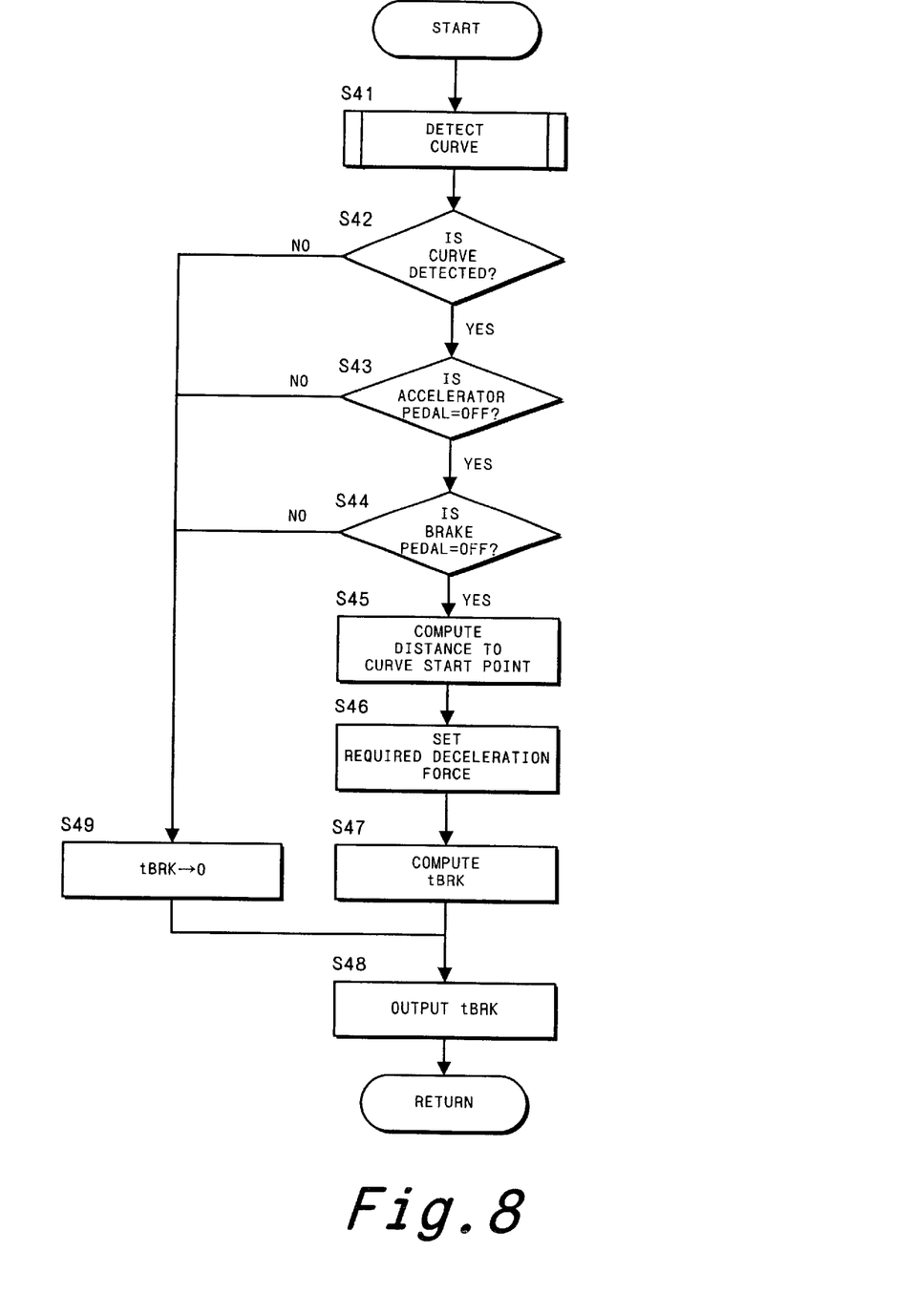
FIG. 8 is similar to FIG.2 but showing a third embodiment of the present invention.

FIG. 8 shows a third embodiment. The drive force control process performed by the controller 10 is shown as in FIG. 2 and FIG. 6, this process being performed at an interval of, e.g. 10 milliseconds.

First, in a step S41, a curve in front of the vehicle 11 is detected. The process of curve detection is the same as in the aforesaid embodiments.

In a step S42, it is determined whether or not a curve has been detected. When it is determined that a curve has been detected, the routine proceeds to a step S43, otherwise the routine proceeds to a step S49 and zero is stored in a brake correction amount tBRK.

In a step S43, it is determined whether or not the driver has released the accelerator pedal based on the output of the sensor 5. When it is determined that the driver has released the accelerator pedal, it is determined that the driver intends to decelerate the vehicle 11, and the routine proceeds to a step S44, otherwise the routine proceeds to a step S49 and zero is stored in the brake correction amount tBRK.

In the step S44, it is detected whether or not the brake pedal is depressed from the output of the sensor 6. When the brake pedal is not depressed, the routine proceeds to a step S45. Conversely, when the brake pedal is depressed, the routine proceeds to the step S49, and zero is stored in the brake correction amount tBRK.

In the step S45, a distance along the road from the vehicle position to the curve start point is computed based on the output of the GPS receiver 8 and map information.

In a step S46, the required deceleration force is set by looking up the map shown in FIG. 3 based on the vehicle speed and distance to the curve start point as in the aforesaid embodiments.

In a step S47, the brake correction amount tBRK necessary to generate the required deceleration force is computed.

In a step S48, the brake correction amount TBRK is output to the brake actuator 4 to generate the required deceleration force, however when the brake correction amount is set to zero in the step S49, a deceleration force is not generated.

Therefore, in the third embodiment, when it is detected that there is a curve in front of the vehicle 11 and the driver has released the accelerator pedal, a brake force is applied by the brake actuator 4 to generate the deceleration force, but this deceleration force is cancelled when the driver depresses the brake pedal.

Hence, after the brake pedal has been depressed, deceleration force occurs only depending on the driver's brake pedal operation, so an excessive deceleration force is avoided, and the driver experiences a natural feeling when the vehicle 11 is decelerated.

Also, a high deceleration force which cannot be obtained with the engine brake may be generated by operating the brake actuator 4, so it is possible to decelerate the vehicle 11 when a high deceleration that cannot be produced by the engine brake is required.

As described already, the deceleration force may also be generated by modifying the speed ratio of the automatic transmission 3 or by automatically reducing the throttle 2. Alternatively, the deceleration force may be generated by the engine brake under ordinary circumstances and by the brake actuator 4 when a particularly high deceleration force is required, i.e. the method of generating the deceleration force can then be chosen according to the situation.

The entire contents of Japanese Patent Applications P10-28662 (filed Feb. 10, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed:

1. A drive force control device for a vehicle comprising:
   deceleration force generating means for decelerating said vehicle,
   a sensor for detecting a position, of said vehicle,
   a storing medium wherein map information is stored,
   a sensor for detecting release of an accelerator pedal, and
   a microprocessor programmed to:
      detect a curve in front of said vehicle based on said vehicle position and map information, and
      control said deceleration force generating means to decelerate said vehicle when a curve is detected in front of said vehicle and release of the accelerator pedal is detected.

2. A control device as defined in claim 1 further comprising a sensor for detecting a speed of said vehicle, wherein said microprocessor is further programmed to:
   calculate a distance between said vehicle position and said curve,
   control said deceleration force generating means to generate a larger deceleration force the shorter said distance.

3. A control device as defined in claim 1, wherein said microprocessor is further programmed to:
   calculate a distance between said vehicle position and said curve,
   set a control permission distance according to said vehicle speed, and
   control said deceleration force generating means to decelerate said vehicle when said distance between said vehicle position and said curve is less than said control permission distance, and release of the accelerator pedal is detected.

4. A control device as defined in claim 3, wherein the rate of increase of said control permission distance relative to said vehicle speed is set to be smaller the smaller a curvature radius of said curve.

5. A control device as defined in claim 3, wherein the rate of increase of said control permission distance relative to said vehicle speed is set not to depend on the curvature radius of said detected curve when the curvature radius of said curve is larger than a predetermined value.

6. A control device as defined in claim 3, wherein said control permission distance is set to be larger than a predetermined value.

7. A controller as defined in claim 1,
   further comprising a sensor for detecting that a brake pedal is depressed, and wherein said microprocessor is further programmed to:
      control said deceleration force generating means to decelerate said vehicle during a time period from the release of the accelerator pedal until the depression of the brake pedal.

8. A controller as defined in claim 1,
   wherein said deceleration force generating means comprises an automatic transmission, and
   said deceleration force generating means decelerates said vehicle by modifying a speed ratio of said transmission.

9. A controller as defined in claim 1,
   wherein said deceleration force generating means comprises a brake actuator which applies a braking force to said vehicle, and
   said deceleration force generating means decelerates said vehicle (11) by applying a braking force of said brake actuator.

* * * * *